A. KARHAN.
BUTCHER'S IMPLEMENT.
APPLICATION FILED SEPT. 26, 1910.
999,501.
Patented Aug. 1, 1911.
2 SHEETS—SHEET 1.
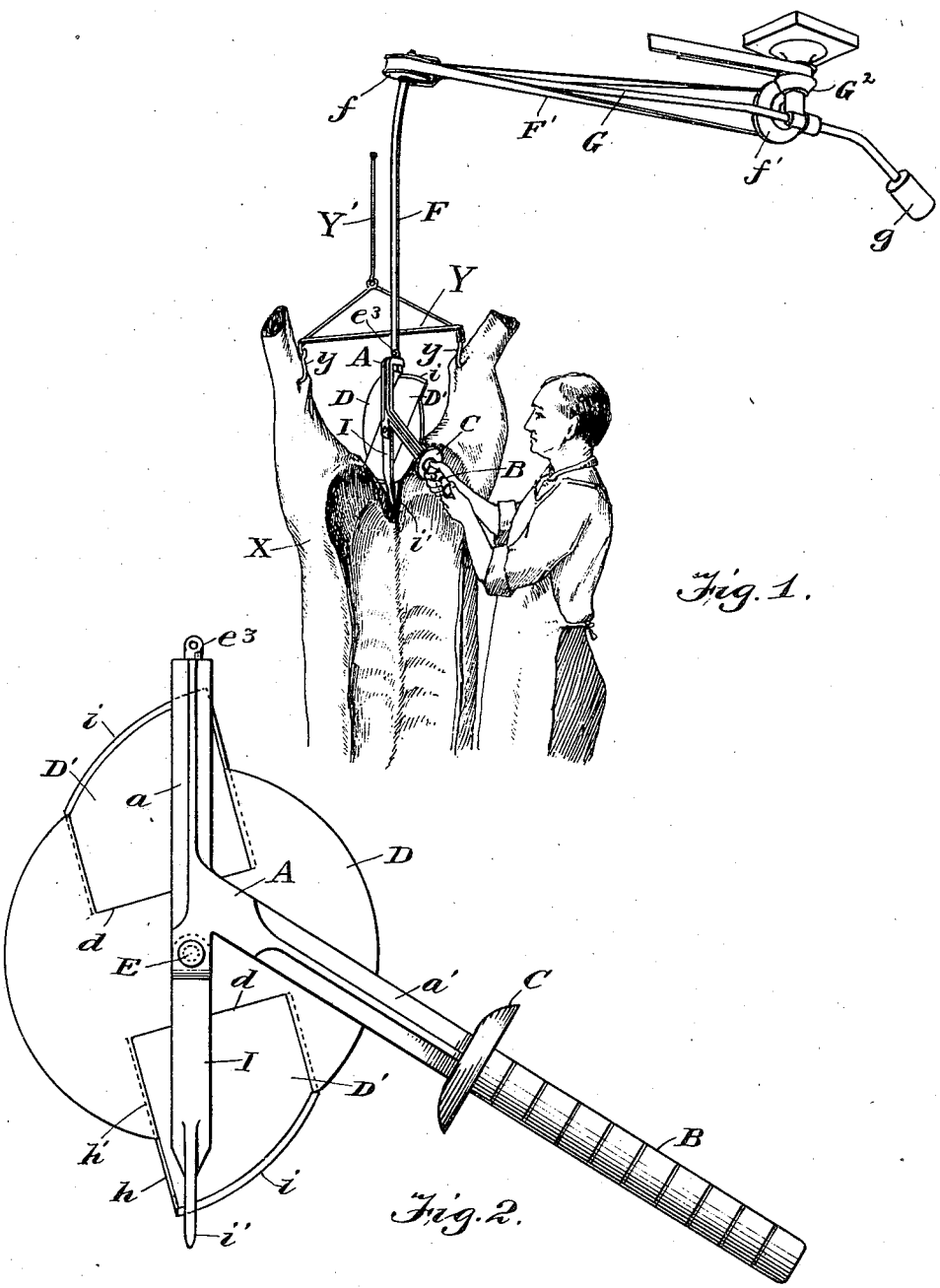
Witnesses:
Inventor:
August Karhan
By his Attorneys, A. KARHAN.
BUTCHER'S IMPLEMENT.
APPLICATION FILED SEPT. 26, 1910.
999,501.
Patented Aug. 1, 1911.
2 SHEETS—SHEET 2.
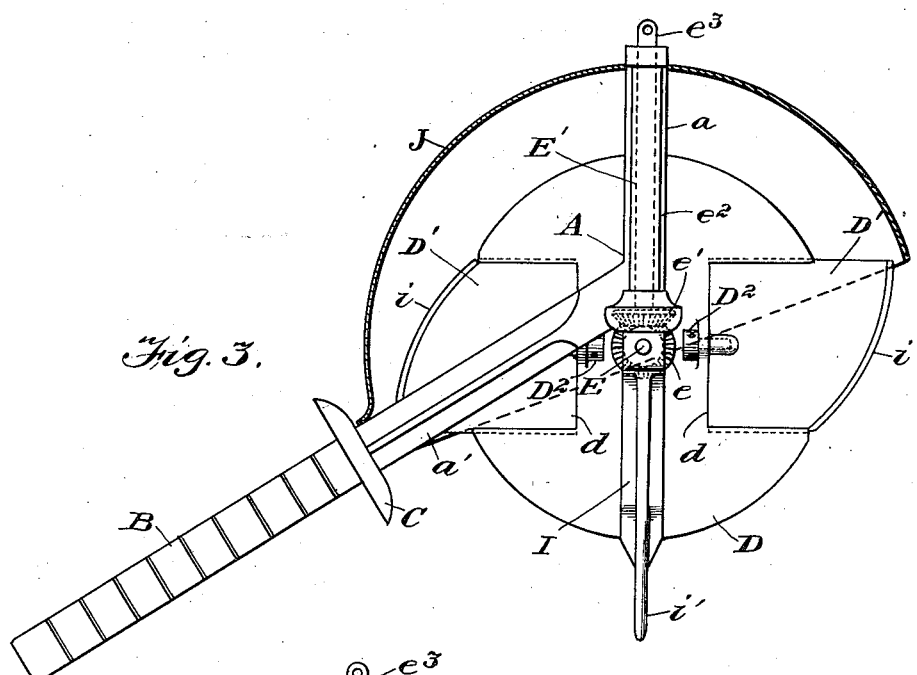
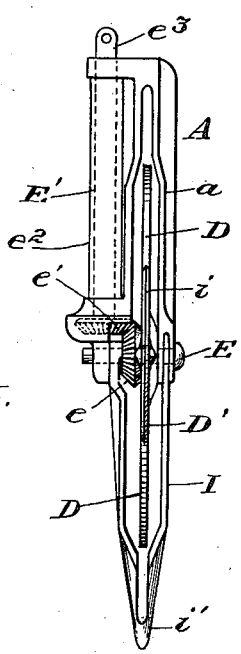
Witnesses:
Inventor:
August Karhan
By his Attorneys,

UNITED STATES PATENT OFFICE.

AUGUST KARHAN, OF NEW YORK, N. Y.

BUTCHER'S IMPLEMENT.

999,501.  Specification of Letters Patent.  Patented Aug. 1, 1911.

Application filed September 26, 1910. Serial No. 583,736.

*To all whom it may concern:*

Be it known that I, AUGUST KARHAN, a citizen of the United States, residing in the city of New York, borough of Manhattan, county and State of New York, have invented a certain new and useful Butcher's Implement, of which the following is a specification.

This invention is a device or implement adapted to be employed by butchers in dividing into halves the carcasses of animals, such as beeves, sheep, and the like.

The device or implement furnishes means by which a carcass may be accurately and rapidly split along the spinal column or backbone, the implement being capable of use by unskilled operators.

The invention comprises cutting mechanism, a guiding member or finder for directing the path of said cutting mechanism relative to the spinal column of the carcass to be split, and means for suspending the cutting mechanism and the guiding member or finder, whereby said cutting mechanism and the finder are adapted for universal movement freely in any direction, and are thus adapted to adjust themselves to the sway or movement of the suspended carcass to be operated upon.

In a practical embodiment of the invention, the implement or device is operated by power and guided by hand. Accordingly, the cutting mechanism is suspended for free universal movement by a frame of suitable construction, and with said cutting mechanism there is combined power operated means for imparting motion to the cutting mechanism. The cutter frame is provided with a handle adapted to be grasped by the operator, and attached to the frame is the finder or guide member which is adapted to be inserted into the cavity of the backbone which contains the spinal cord, whereby the finder or guide member operates to accurately position the implement for cutting the spinal column along the middle thereof. The implement is shifted along the backbone as the cutting operation progresses, and by driving the cutting mechanism by power, the operator is required only to shift the implement up to the work, the guiding means or finder serving to position the implement with precision because said guiding means or finder follows the spinal cord cavity in the backbone, whereby the operation of splitting the carcass is performed rapidly and accurately.

Other objects and advantages of the invention will appear from the annexed detailed description.

In the accompanying drawings I have illustrated one practical embodiment of the invention, but the construction shown therein is to be understood as illustrative, only, and not as defining the limits of the invention.

Figure 1 is a perspective view illustrating the operation of the new butcher's implement in splitting a carcass in halves. Fig. 2 is a side elevation of the implement on an enlarged scale. Fig. 3 is another elevation looking at the opposite side of the implement from Fig. 2. Fig. 4 is an elevation of the implement looking at one edge of the cutting mechanism.

For supporting the operating parts of the implement a frame, A, is employed, said frame consisting of members, $a$, $a'$, positioned at an angle to each other. The members composing the frame are preferably cast in one piece, and said members are forked or bifurcated to accommodate cutting mechanism hereinafter described. Member, $a'$, of the frame is provided with a handle, B, of any suitable construction and adapted to be grasped by one or both hands of the operator, and positioned at one end of the handle is a guard, C, said guard being attached in a suitable way to member, $a'$, of the frame. The guard may be of any suitable construction, and it is intermediate the handle and the cutting mechanism for the purpose of precluding the hands of the operator from slipping on the handle and into the path of said cutting mechanism.

The cutting mechanism which it is preferred to employ is of the rotary type, although it is evident that other kinds of cutting mechanism, such as reciprocating cutters, may be employed without departing from the invention.

As shown, a cutter disk or head, D, is positioned within the slotted or bifurcated members, $a$, $a'$, of the frame, said disk or cutter head carrying a plurality of cutter blades or knives, D'. The cutter disk or head is secured rigidly to a shaft, E, the latter being mounted preferably at a point below the juncture of members, $a$, $a'$, although the particular location of said cutter shaft is not material. The cutter shaft is provided with a bevel gear, $e$, with which meshes another bevel gear, $e'$, on shaft, E', the latter being positioned within a bearing sleeve, $e^2$, on member, $a$, of the frame. The bearing sleeve, $e^2$, and shaft, E', are positioned radially with respect to the cutter, said shaft, E', being mounted on frame, A, for rotation with respect thereto, whereby the cutter head is adapted to be rotated when shaft, E', is driven by suitable mechanism. The shaft, E', extends at its outer end beyond sleeve, $e^2$, and frame, A, the extended end of the shaft being indicated at $e^3$, whereby the shaft, E', is adapted to be coupled with a flexible shaft, F. Said flexible shaft is supported in a balanced overhead frame, G, see Fig. 1, and on the upper part of said flexible shaft is a pulley, $f$, which is engaged by a belt, F', that is driven from a pulley, $f'$, supported in a hanger, G². The overhead frame, G, is balanced by a counterweight, $g$, said frame being supported in the hanger for movement in horizontal and vertical planes, whereby the overhead frame, G, operates to support the flexible shaft and the cutting implement or device, said cutting implement being freely suspended for universal movement in order to adjust itself to changes in the position of a suspended carcass. It will be noted that the balanced overhead frame will operate to suspend the cutting implement, and at the same time support the flexible shaft which is driven by the belt and pulley mechanism so as to impart rotary motion to the cutter head. The overhead frame may be raised and lowered by the operator who grasps handle, B, of the cutting implement, and, furthermore, the entire device may be moved in a horizontal plane so as to bring the cutting implement into and out of operative relation to a suspended carcass.

As shown, cutter head, D, is provided with a plurality of openings, $d$, preferably two in number, and in these openings are positioned the blades or knives, D'. Said blades or knives are preferably adjusted, and for this purpose each knife is slidably supported within the opening and is operatively related to an adjusting screw, D². As shown, the side edges of each knife, D', are beveled at $h$, and said beveled edges are fitted slidably in grooves, $h'$, provided in the side edges of openings, $d$, in the cutter head. Each blade is adjusted radially with respect to the cutter head by a screw, D², the latter being mounted on the cutter head and engaging with the inner end portion of the blade. Each blade, D', is provided with a curved cutting edge, $i$, said cutting edge of the blade being eccentric to the cutter head as shown more clearly in Figs. 2 and 3 of the drawings. The cutting edges of the blades thus extend well beyond the circular edge of the cutter head, whereby the blades are adapted to act with a draw or shear cut upon the back bone or spinal column of a carcass.

An important feature of this invention is a finder or guiding member, I, for determining the position of the implement with precision relative to the carcass to be operated upon. Said finder or guiding member is shown as a bifurcated or forked casting which tapers toward one end so as to produce a finger, $i'$. The bifurcated finder or guiding member loosely fits around a part of the cutter head and at the inner end of said finder or guiding member it is mounted loosely upon the cutter shaft, E, whereby the guiding member is connected pivotally to the frame of the implement. The finder or guiding member is of such length that the blades, D', will rotate freely through the slot or bifurcation in said finder or guiding member, I. When the implement is in use the finder or guiding member extends downwardly from the cutter shaft for its finger, $i'$, to extend beyond the cutter head and the path of the cutter blades, the finger, $i'$, of said finder or member fitting into the spinal cord cavity of the carcass.

As is usual, the carcass, indicated at X in Fig. 1, is adapted to be suspended in front of the operator. Any suitable means may be employed for suspending said carcass, but in Fig. 1 a hanger, Y, is employed. The hanger is shown as a cross bar provided with hooks, $y$, adapted to engage with the hind legs of the carcass, and to this cross bar there is connected a cable, Y', which may be fastened to any suitable supporting means.

The operation of the invention is as follows. The hanger is attached to the carcass and the latter is suspended adjacent to the cutting mechanism. The operator takes position in front of the carcass and grasps handle, B, with both hands. Pulley, $f'$, being in motion, belt, F', operates to drive pulley, $f$, and this pulley in turn drives flexible shaft, F, the latter being coupled with shaft, E', for imparting rotary motion through gears, $e$, $e'$, to cutter head, D. Before adjusting the cutting mechanism into position for severing the carcass, the tail bone and a part of the spinal column is split, preferably by sawing said parts until the spinal cord cavity is reached. The carcass being suspended in an opened position, the operator now adjusts the cutting mechanism for the finger, $i'$, of finder or guide member, I, to enter the spinal cord cavity, whereby the finder or guiding member determines the position of the cutting mechanism with respect to the spinal cord. The cutter being rotated by the described means, the blades, D', act upon the spinal column to cut the same substantially centrally thereof. As the cutting operation progresses, the operator shifts the implement along the back bone, but it is not necessary for the operator to guide the implement for the reason that the finger, i', of finder or member, I, will automatically follow the spinal cord cavity. The implement is gradually lowered as the blades of the rotary cutter head sever the spinal column, and the operation of dividing the carcass can thus be performed easily and rapidly by an unskilled workman.

Although I have shown and described the implement as constructed with a rotary cutting mechanism, it will be understood that the invention is not limited to any particular form of cutting mechanism, for the reason that I may employ other power driven mechanism adapted to sever a carcass along the spinal column. The implement of this invention is suspended by a balanced overhead frame, whereby the operator is relieved of the weight of the implement, and at the same time provision is made for transmitting power to the mechanism which operates to sever the spinal column of the carcass.

As shown in Fig. 3, a hood or shield, J, is attached in any suitable way to supporting frame, A, said shield or hood inclosing the upper part of the implement and precluding the power operated cutting mechanism from injuring the operator accidentally.

Having thus fully described the invention, what I claim as new, and desire to secure by Letters Patent is:

1. In a device of the class described, cutting mechanism, means for suspending said cutting mechanism for free universal movement and means connected with the suspended and freely movable cutting mechanism for directing the path of movement thereof relative to the spinal column of the carcass to be severed.

2. In a device of the class described, a cutter frame, means for suspending the same for free universal movement, cutting mechanism supported by the frame, and a finder pivoted to the frame and adapted to direct the path of said cutting mechanism relative to the material to be operated upon.

3. In a device of the class described, cutting mechanism, means for supporting the cutting mechanism for free movement in practically all directions, guiding means adapted for engagement with the material to be operated upon and to direct the path of said cutting mechanism, and manually operated means separate from the guiding means for adjusting and controlling the device.

4. In a device of the class described, a cutter frame, means for suspending the cutter frame whereby it is adapted for free universal movement, cutting mechanism, a guiding member connected to the frame and adapted for engagement with the material to be operated upon, and a manually operated handle separate from the guiding member for adjusting and controlling the device.

5. In a device of the class described, a cutter frame, means for suspending the cutter frame whereby it is adapted for free universal movement, cutting mechanism carried by the frame, a guiding member connected to the frame and adapted for engagement with the material to be operated upon, and power operated mechanism for imparting movement to the suspended cutting mechanism.

6. In a device of the class described, a supporting device, a cutter frame suspended therefrom for universal movement, cutting mechanism on said frame, a guiding member or finder attached to said frame, a handle separate from the guiding member for adjusting and controlling the frame, and power operated mechanism for imparting motion to the cutting mechanism.

7. In a device of the class described, a cutter frame, means for suspending said cutter frame whereby it is adapted for movement in practically all directions, a rotatable cutter mounted in said cutter frame, means for imparting motion to said cutter, and a guide member connected to the frame, said cutter being movable relative to the guide member.

8. In a device of the class described, a cutter frame provided with a handle, means for suspending said cutter frame whereby it is adapted for movement in practically all directions, a cutter shaft in the suspended frame, a rotary cutter on said shaft, a driving shaft journaled on the suspended frame and geared to the cutter shaft, and a slotted finder pivoted to the frame.

9. In a device of the class described, a cutter frame, means for suspending said cutter frame whereby it is adapted for movement in practically all directions, a slotted guide member pivoted to the frame, and a cutter supported on the frame and movable within the slot of said finder.

10. In a device of the class described, a cutter frame provided with a handle, means for suspending said cutter frame whereby it is adapted for free universal movement, a slotted finder or guide member pivoted to the cutter frame and movable to different positions relative thereto, and a rotary cutter mounted in the cutter frame, said cutter having blades adapted to operate in the slot of the finder or guide member.

11. In a device of the class described, a cutter frame provided with a handle, means for suspending said cutter frame whereby it is adapted for free universal movement, a slotted finder or guide member pivoted to the cutter frame and movable to different positions relative thereto, and a cutter rotatable within the suspended frame, the cutting edges of said cutter being eccentric to the axis of rotation of the cutter and operating in the slot of said finder or guide member.

In testimony whereof I have signed my name to this specification in the presence of two subscribing witnesses.

AUGUST KARHAN.

Witnesses:
H. I. BERNHARD,
J. F. MOTHERSHEAD.